United States Patent
Tang

(10) Patent No.: US 11,382,064 B2
(45) Date of Patent: Jul. 5, 2022

(54) METHOD AND DEVICE FOR DETERMINING PAGING TIME, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 15 days.

(21) Appl. No.: 16/886,563

(22) Filed: May 28, 2020

(65) Prior Publication Data
US 2020/0296686 A1 Sep. 17, 2020

Related U.S. Application Data

(63) Continuation of application No. PCT/CN2017/114296, filed on Dec. 1, 2017.

(51) Int. Cl.
H04W 68/02 (2009.01)
H04W 72/12 (2009.01)

(52) U.S. Cl.
CPC ....... *H04W 68/02* (2013.01); *H04W 72/1205* (2013.01)

(58) Field of Classification Search
CPC . H04W 68/00–02; H04W 72/00–0453; H04W 72/1205
See application file for complete search history.

(56) References Cited

U.S. PATENT DOCUMENTS

| | | | |
|---|---|---|---|
| 9,872,272 B2 | 1/2018 | Mochizuki | |
| 2013/0136072 A1 | 5/2013 | Bachmann | |
| 2013/0203450 A1 | 8/2013 | Mochizuki | |
| 2014/0128109 A1 | 5/2014 | Li et al. | |
| 2016/0234804 A1 | 8/2016 | Hu et al. | |
| 2017/0019878 A1 | 1/2017 | Hu et al. | |
| 2018/0076937 A1* | 3/2018 | Nasiri Khormuji | H04W 72/0453 |
| 2018/0110027 A1 | 4/2018 | Mochizuki et al. | |

(Continued)

FOREIGN PATENT DOCUMENTS

| | | |
|---|---|---|
| CN | 103120002 A | 5/2013 |
| CN | 105191356 A | 12/2015 |

(Continued)

OTHER PUBLICATIONS

3GPP TSG RAN WG1 Meeting #91 R1-1720001 Reno, USA, Nov. 27-Dec. 1, 2017, title: "On NR paging design", Agenda Item: 7.1.3, hereinafter R1-1720001 (Year: 2017).*

(Continued)

*Primary Examiner* — Ronald Eisner
(74) *Attorney, Agent, or Firm* — Ladas & Parry, LLP

(57) ABSTRACT

A method for determining paging time, which includes that: a user equipment (UE) determines a paging time unit corresponding to the UE according to an identifier of the UE, configuration parameters of paging time units, and preset rules, where the paging time units comprise a paging time unit of a first type and a paging time unit of a second type, and paging time units of different types correspond to different preset rules. A UE and a network device are also provided.

10 Claims, 7 Drawing Sheets

PSS  SSS  PBCH

Frequency division is implemented for a time-domain resource of PO and a time-frequency resource of a nominal resource A time-domain resource of PO includes a time-frequency resource of a nominal resource

(56) References Cited

U.S. PATENT DOCUMENTS

| | | | |
|---|---|---|---|
| 2018/0270790 A1* | 9/2018 | Shi | .................... H04W 52/0209 |
| 2018/0317198 A1 | 11/2018 | Lee et al. | |
| 2019/0254000 A1 | 8/2019 | Mochizuki et al. | |
| 2020/0120633 A1 | 4/2020 | Mochizuki et al. | |

FOREIGN PATENT DOCUMENTS

| | | | |
|---|---|---|---|
| CN | 107018496 A | 8/2017 | |
| CN | 107223357 A | 9/2017 | |
| EP | 2624644 A1 | 8/2013 | |
| WO | 2015051547 A1 | 4/2015 | |
| WO | 2016180450 A1 | 11/2016 | |
| WO | 2017079574 A1 | 5/2017 | |
| WO | WO-2017079574 A1 * | 5/2017 | ........... H04L 5/0007 |
| WO | 2017101102 A1 | 6/2017 | |
| WO | 2017190269 A1 | 11/2017 | |
| WO | 2019104723 A1 | 6/2019 | |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 14)" 3GPP TS 36.304, 3rd Generation Partnershipproject (3GPP), Mobile Competence Centre; 650, Route Des Lucioles F-06921 Sophia-Antipolis Cedex: France vol. RAN WG2, No. V14.4.0, Sep. 25, 2017 (Sep. 25, 2017), pp. 1-49, XP051337305, sections 7.

Written Opinion of the International Search Authority in the international application No. PCT/CN2017/114296, dated Aug. 22, 2018.

Ericsson: "Remaining details on paging design", 3GPP Draft; R1-1720939 Remaining Details on Paging, 3rd Generatton Partnership Project (3GPP), Mobile Competence Centre; 650, Route Des Lucioles; F-06921 Sophia-Antipolis Cedex; France, vol. RAN WG1, No. Reno, Nevada, US; Dec. 27, 2017-Dec. 1, 2017; Nov. 18, 2017 (Nov. 18, 2017), XP051370313, Retrieved from the Internet: URL: http://www.3gpp. org/ftp/tsg%5Fran/WG15FRL1/TSGR1%5F91/ Docs/[ retrieved on Nov. 18, 2017] * sections 2.4-2.5 *.

NTT Docomo et al.: "Remaining details on paging design for NR", 3GPP Draft; R1-1720793 Remaining Details on Paging Design for NR Final, 3rd Generation Partnership Project (3GPP), Mobile Competence Centre; 650, Route Des Lucioles; F-06921 Sophia-Antipolis Cedex; vol. RAN WG1, No. Reno, USA; Nov. 27, 2017-Dec. 1, 2017; Nov. 18, 2017 (Nov. 18, 2017), XP051370222, Retrieved from the Internet: URL: http://www.3gpp.org/ftp/tsg%5Fran/WG1%5FRL1/TSGR1%5F91/Docs/[retrieved on Nov. 18, 2017] * proposals 5-6 *.

"3rd Generation Partnership Project; Technical Specification Group Radio Access Network; NR; NR and NG-RAN Overall Description; Stage 2 (Release 15)", 3GPP Standard; Technical Specification; 3GPP TS 38.300. 3rd Generation Partnership Project (3GPP), Mobile Competence Centre; 650, Route Des Lucioles; F-06921 Sophia-Antipolis Cedex; France, vol. RAN WG2, No. V1.2.1, Nov. 17, 2017 (Nov. 17, 2017), pp. 1-56, XP051391742, [ retrieved on Nov. 17, 2017]* sections 9.2.5 and 16.4*.

Nokia: "Way forward on the mapping of ss blocks", 3GPP Draft; R1-1711899, 3rd Generation Partnership Project (3GPP), Mobile Ompetence Centre; 650, Route Des Lucioles; F-06921 Sophia-Antipolis Cedex; France, vol. RAN WG1, No. Qingdao, China; Jun. 27, 2017-Jun. 30, 2017, Jun. 29, 2017 (Jun. 29, 2017), XP051306077, Retrieved from the Internet: URL: http://www.3gpp.org/ftp/tsg_ran/WG1_RL1/TSGR1_AH/NR_AH1706/Docs/[ retrieved on Jun. 29, 2017] * the whole document *.

Huawei et al.: "Offline summary for AI 7.1.3 on Paging", 3GPP Draft; R1-1721356 Summary on Paging V1.3, 3rd Generation Partnership PROJECT(3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 29, 2017 (Nov. 29, 2017), XP051363970, Retrieved from the Internet: URL: http://www.3gpp.org/ftp/Meetings%5 F3GPP%5FSYNC/ RAN1/Docs/[ retrieved on Nov. 29, 2017] *sections 4.1.1 and 4.2.1 *.

CATT: "NR Paging Channel", 3GPP Draft; R1-1720172, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017Dec. 1, 2017, Nov. 18, 2017 (Nov. 18, 2017), XP051369808, Retrieved from the Internet: URL: http://www.3gpp.org/ftp/tsg%5Fran/WG1%5FRL1/ TSGR1%5F91/Docs/[retrieved on Nov. 18, 2017] *section 3 *.

VIVO: "Remaining details on NR paging design", 3GPP Draft; R1-1719759 Remaining Details on NR Paging Design, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017 (Nov. 18, 2017), XP051369502, Retrieved from the Internet: URL: http://www.3gpp.org/ftp/tsg%5Fran/WG1%5FRL1/ TSGR1%5F91/Docs/[ retrieved on Nov. 18, 2017] * section 2.3 *.

Supplementary European Search Report in the European application No. 17933349.7, dated Nov. 13, 2020.

First Office Action of the European application No. 17933349.7, dated Jul. 15, 2021.

First Office Action of the Korean application No. 10-2020-7018862, dated Jun. 29, 2021.

First Office Action of the Chinese application No. 202010734201.X, dated Aug. 27, 2021.

OPPO. "R1-1720001, On NR Paging Design" 3GPP TSG RAN WG1 Meeting #91, Nov. 18, 2017(Nov. 18, 2017), section 2, and figures1-2.

International Search Report in the international application No. PCT/CN2017/114296, dated Aug. 22, 2018.

Office Action of the Indian application No. 202027027576, dated Nov. 11, 2021.

Second Office Action of the Chinese application No. 20201073 4201 .X, dated Nov. 26, 2021.

3GPP TSG RAN WG1 Meeting #92 R1-1802133, OPPO, Discussion on paging design, Athens, Greece, Feb. 26-Mar. 2, 2018, entire document.

First Office Action of the Japanese application No. 2020-529466, dated Nov. 30, 2021.

Decision of Refusal of the Korean application No. 10-2020-7018862, dated Dec. 23, 2021.

Second Office Action of the European application No. 17933349.7, dated Jan. 24, 2022.

Decision of Rejection of the Chinese application No. 202010734201. X, dated Feb. 28, 2022.

Notice of Second Rejection of the Korean application No. 10-2020-7018862, dated Feb. 22, 2022.

* cited by examiner

| PSS | PBCH | SSS | PBCH |

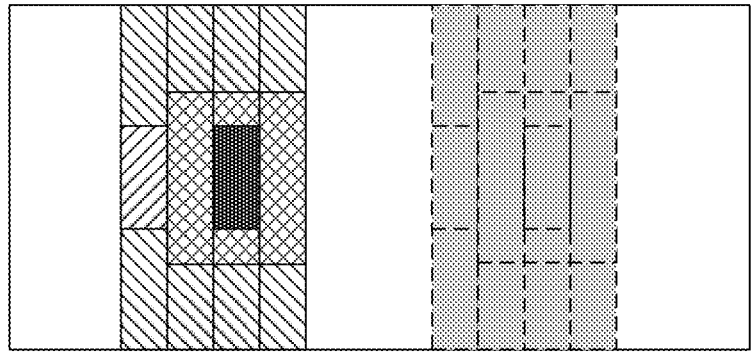

☒ PSS  ■ SSS  ☒ PBCH

☒ Frequency division is implemented for a time-domain resource of PO and a time-frequency resource of a nominal resource ▦ A time-domain resource of PO includes a time-frequency resource of a nominal resource

FIG. 7

UE determines a paging time unit corresponding to the UE according to an ID of the UE, configuration parameters of paging time units, and preset rules, the paging time units at least including a paging time unit of a first type and a paging time unit of a second type and paging time units of different types corresponding to different preset rules  —801

FIG. 8

METHOD AND DEVICE FOR DETERMINING PAGING TIME, AND COMPUTER STORAGE MEDIUM

CROSS-REFERENCE TO RELATED APPLICATION

This application is a U.S. continuation application of International Application No. PCT/CN 2017/114296, entitled "METHOD AND DEVICE FOR DETERMINING PAGING TIME, AND COMPUTER STORAGE MEDIUM", filed on Dec. 1, 2017, the disclosure of which is hereby incorporated by reference in its entirety.

TECHNICAL FIELD

The disclosure relates to the technical field of wireless communications, and particularly to a method and device for determining paging time, and a computer storage medium.

BACKGROUND

In a Long Term Evolution (LTE) system, a network may initiate paging to User Equipment (UE) in an idle state and UE in a connection state. The UE may receive a paging message in a paging time unit in a Paging Frame (PF) in a Discontinuous Reception (DRX) cycle.

UE determines a position of a paging time unit corresponding to the UE in a DRX cycle according to its UE_ID, and then receives a paging message.

SUMMARY

For solving the technical problem, embodiments of the disclosure provide a method and device for determining paging time, a UE and a network device.

The embodiments of the disclosure provide a method for determining paging time, which may include the following operations.

UE determines a paging time unit corresponding to the UE according to an Identifier (ID) of the UE, configuration parameters of paging time units, and preset rules.

The paging time units may at least include a paging time unit of a first type and a paging time unit of a second type, and paging time units of different types may correspond to different preset rules.

The embodiments of the disclosure provide a method for determining paging time, which may include the following operations.

A network determines a paging time unit corresponding to UE according to an ID of the UE, configuration parameters of paging time units, and preset rules, where the paging time units at least include a paging time unit of a first type and a paging time unit of a second type, and paging time units of different types corresponding to different preset rules.

The network sends a paging message in the paging time unit.

The embodiments of the disclosure provide a UE, which include:
a processor; and
a memory storing computer readable instructions executable by the processor,
the processor is configured to:
determine a paging time unit corresponding to UE according to an ID of the UE, configuration parameters of paging time units, or preset rules.

The paging time units may at least include a paging time unit of a first type and a paging time unit of a second type, and paging time units of different types may correspond to different preset rules.

The embodiments of the disclosure provide a network device, which may include:
a processor; and
a memory storing computer readable instructions executable by the processor,
the processor is configured to:
determine a paging time unit corresponding to UE according to an ID of the UE, configuration parameters of paging time units, and preset rules, where the paging time units at least include a paging time unit of a first type and a paging time unit of a second type, and paging time units of different types corresponding to different preset rules.

The sending unit may be configured to send a paging message in the paging time unit.

These aspects or other aspects of the disclosure will become clearer and easier to understand through the following descriptions about the embodiments.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings:

FIG. 7 is a distribution diagram of time-frequency resources of a PO.

FIG. 8 is a first flowchart of a method for determining paging time according to an embodiment of the disclosure.

DETAILED DESCRIPTION

For making the technical solutions of the embodiments of the disclosure convenient to understand, key technologies involved in the embodiments of the disclosure will be explained and described below.

1) Beam in 5th Generation (5G)

Figures 1, 2:
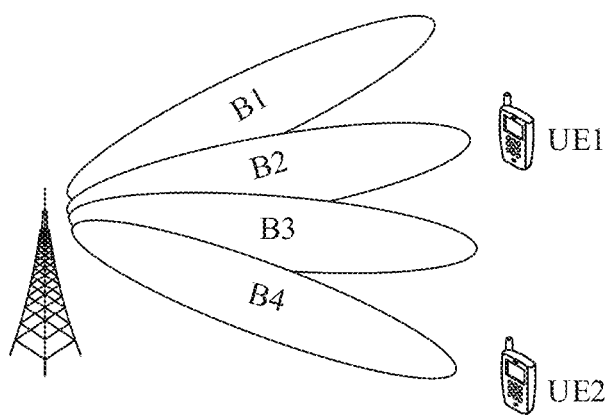
FIG. 1 is a schematic diagram of sending a wireless signal by a base station through a beam.
FIG. 2 is a schematic diagram of an SS block.

Since a band adopted for a 5G system is higher than that for an LTE system, path losses of wireless signal transmission of the 5G system is greater than that of the LTE system, resulting in a smaller coverage of a wireless signal of the 5G system. Therefore, in the 5G system, a beamforming technology is adopted to form a beam through a multi-antenna system of a base station to increase a gain of the wireless signal to compensate for the path losses. In the beamforming technology, a beam is directional, and a narrow beam may not cover all regions of a cell but only cover part of regions of the cell. As illustrated in FIG. 1, the base station may send signals through four beams (B1, B2, B3 and B4) of different directions. The beam B2 may not cover UE2 but only cover UE1.

2) Synchronization Signal Block (SS Block) in 5G

A common channel and common signal, for example, a broadcast channel and an SS, in the 5G system are required to cover a whole cell in a multi-beam scanning manner such that UE in the cell may receive these signals. Multi-beam transmission of synchronization signals (SS) is implemented by defining an SS burst set. One SS burst set includes one or more SS bursts, and one SS burst includes one or more SS blocks (which may also be called SSB for short). One SS block carries an SS and broadcast channel of one beam. Therefore, one SS burst set may include SSs of beams that are of a same number as SS blocks in the cell. As illustrated in FIG. 2, an SS block includes one symbol for a Primary Synchronization Signal (PSS), one symbol for a Secondary Synchronization Signal (SSS), and two symbols for Physical Broadcast Channels (PBCHs).

The number L of SS blocks in an SS burst set is determined according to a band of the system. For example:

for a band of 3 GHz, L is 4;

for a band of 3 GHz-6 GHz, L is 8; and for a band of 6 GHz-52.6 GHz, L is 64.

Figure 3:
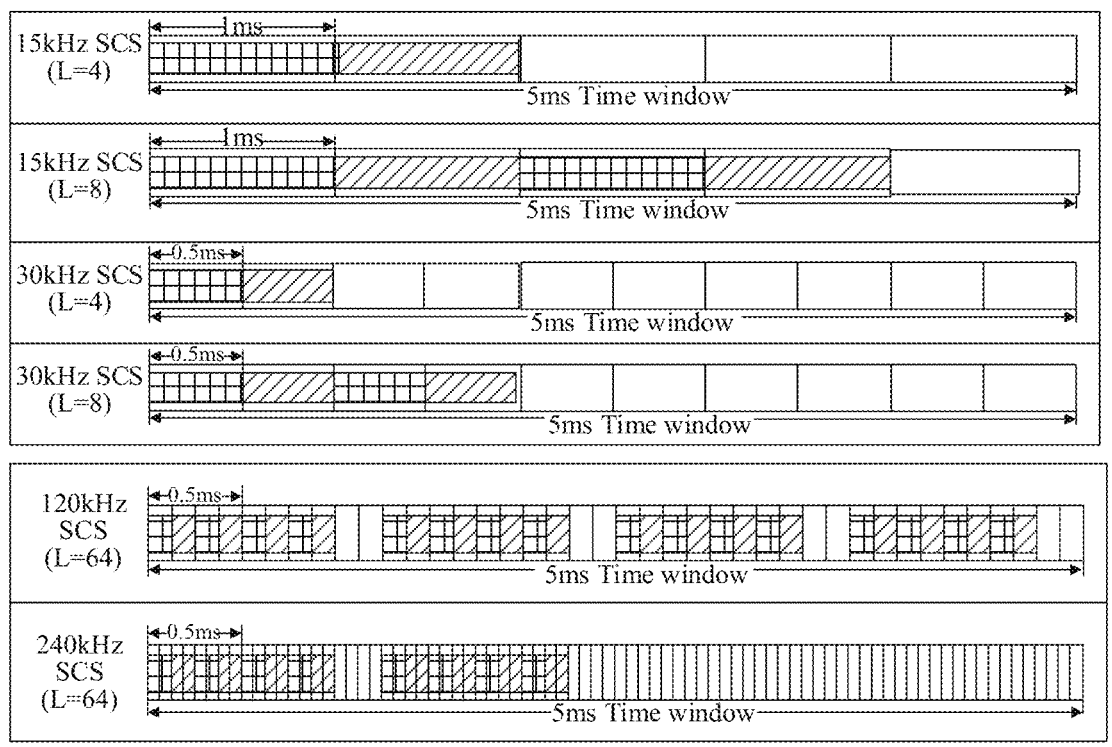
FIG. 3 is a diagram of slot distributions under different Subcarrier Spacings (SCSs) and bands.

For an SS burst set, a transmission cycle thereof may be configured, and in an example, an SS burst set in one cycle is sent in a 5 ms time window. In addition, an SCS of the system may also be configured, and slot distributions under different SCSs and bands are illustrated in FIG. 3. FIG. 3 illustrates, from top to bottom:

a slot distribution of the SS burst set under a 15 KHz SCS and L=4 (corresponding to the band of 3 GHz);

a slot distribution of the SS burst set under the 15 KHz SCS and L=8 (corresponding to the band of 3 GHz-6 GHz);

a slot distribution of the SS burst set under a 30 KHz SCS and L=4 (corresponding to the band of 3 GHz);

a slot distribution of the SS burst set under the 30 KHz SCS and L=8 (corresponding to the band of 3 GHz-6 GHz);

a slot distribution of the SS burst set under a 120 KHz SCS and L=64 (corresponding to the band of 6 GHz-52.6 GHz); and a slot distribution of the SS burst set under a 240 KHz SCS and L=64 (corresponding to the band of 6 GHz-52.6 GHz).

Figure 4:
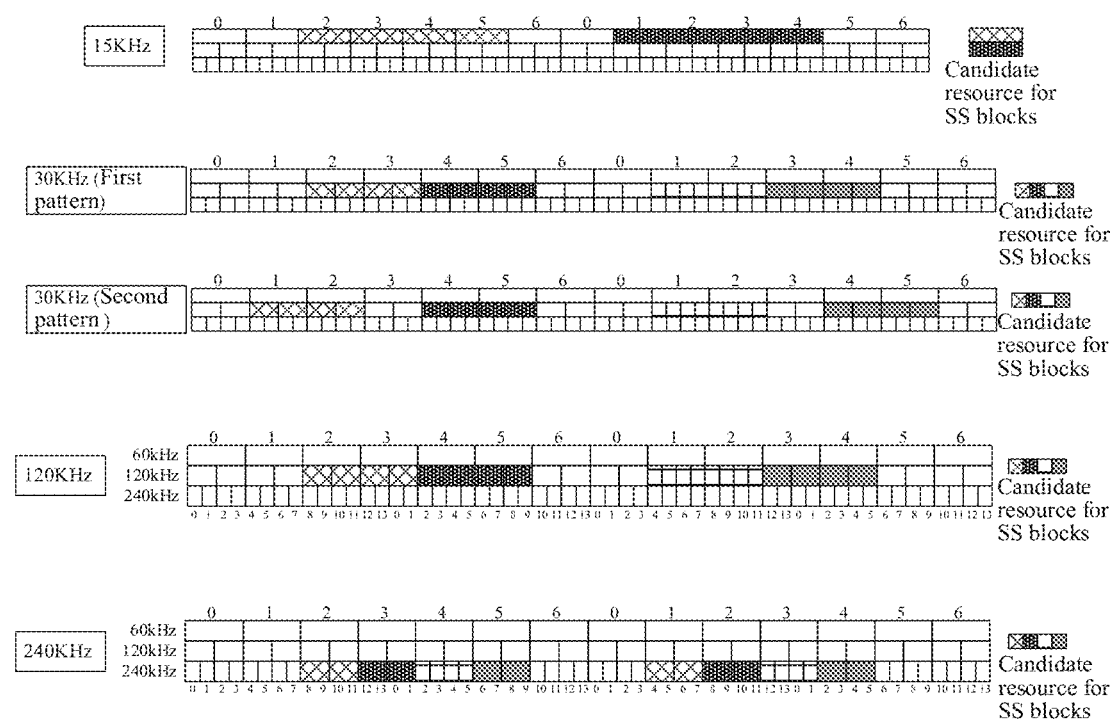
FIG. 4 is a diagram of distributions of SS blocks under different SCSs.

Furthermore, for a distribution of SS blocks in one slot, one slot includes 14 symbols and may carry at most two SS blocks. Distributions of SS blocks under different SCSs are illustrated in FIG. 4. FIG. 4 illustrates, from top to bottom:

a distribution of SS blocks in one slot under a 15 KHz SCS;

a first distribution of SS blocks in one slot under a 30 KHz SCS;

a second distribution of SS blocks in one slot under the 30 KHz SCS;

a distribution of SS blocks in one slot under a 120 KHz SCS; and a distribution of SS blocks in one slot under a 240 KHz SCS.

In the solution, although the number L of the SS blocks is determined according to the frequency range of the system, L is only a maximum number of the SS blocks, and the number of SS blocks practically transmitted by a network may be less than L. The number of the SS blocks practically transmitted by the network is required to be indicated to UE to perform rate matching. A time-frequency resource position where no SS block is transmitted may be used to transmit another channel, for example, a Physical Downlink Shared Channel (PDSCH). Herein, information of the SS blocks practically sent by the network is indicated through Remaining Minimum System Information (RMSI).

Figure 5:
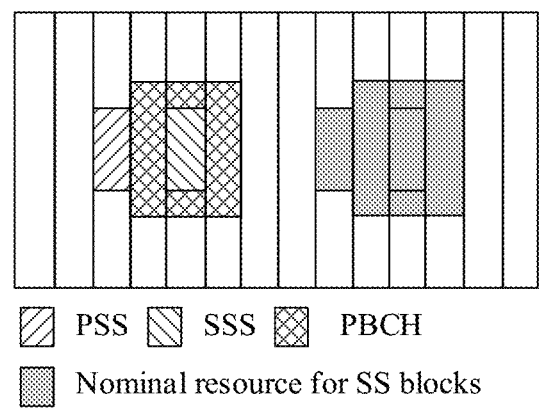
FIG. 5 is a diagram of a position distribution of predefined time-frequency resources where SS blocks are located in a slot.

Locations of predefined time-frequency resources where SS blocks are located in a slot are illustrated in FIG. 5. However, due to different cycles of the SS blocks and different SS blocks that are practically sent, there are not always SS blocks sent on the predefined time-frequency resources, and thus these predefined time-frequency resources are called nominal resources for the SS blocks.

3) Paging in LTE

In an LTE system, a network may initiate paging for UE in an idle state and UE in a connection state. A paging procedure may be triggered by a core network or triggered by a base station to send a paging request to the UE in the idle state, notify the UE of an system information update, or notify the UE to receive Earthquake and Tsunami Warning System (ETWS) information and Commercial Mobile Alert Service (CMAS) information, etc. The base station, after receiving paging messages from the core network, parses the paging messages to obtain a Tracking Area (TA) list of the UE, and performs air interface paging on cells of TAs in the TA list. Furthermore, the base station, after receiving the paging messages from the core network, aggregates the paging messages corresponding to the same PO into one paging message for transmission to the related UE through a paging channel. The UE receives a paging parameter through a system message, calculates the PO based on the paging parameter in combination with its own International Mobile Subscriber Identification Number (IMSI), and receives the paging message in a time range corresponding to the PO. Herein, the paging message is carried through a PDSCH. The UE obtains paging indication information by detecting a Physical Downlink Control Channel (PDCCH) scrambled with a Paging Radio Network Temporary Identity (P-RNTI), and receives the paging message in the PDSCH. Furthermore, the UE in the idle state may save power in a DRX manner, and the UE acquires DRX related information from a System Information Block 2 (SIB2) and monitors the PDCCH scrambled with the P-RNTI in a PO in a PF in a DRX cycle to receive the paging message.

Figure 6:
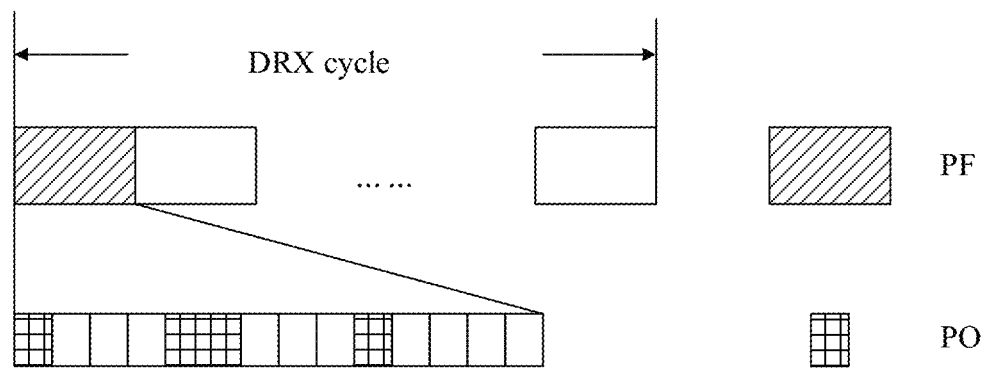
FIG. 6 is a distribution diagram of a PF and a PO.

In the solution, the PF represents a specific System Frame Number (SFN) where the paging message should appear, and the PO represents subframes in which the paging message may appear. A PF may include one or more PO subframes, and in each DRX cycle or paging cycle, the UE is only required to monitor the PO subframe for it. A distribution of a PF and a PO is illustrated in FIG. 6. A radio frame with a SFN that meets the following formula may be determined as a PF.

$$\text{SFN mod } T = (T \text{ div } N) * (UE\_\text{ID mod } N).$$

T represents the DRX cycle or the paging cycle of the UE. In a case that a default paging cycle carried in the SIB2 is represented as T_sib, if a DRX value T_ue of the UE has been configured, then T=min(T_ue, T_sib), which means that T is equal to a minimum value between T_ue and T_sib; if T_ue is not configured, then T=T_sib. UE_IE=(IMSI mode 1024), namely all IMSIs are divided into 1,024 groups, and the IMSI is unique for each UE. N=min(T, nB), which means that N is equal to a minimum value between T and nB, where the parameter nB represents a paging density, nB is carried in the SIB2 and a value range thereof is {4T, 2T, T, T/2, T/4, T/8, T/16, T/32}, and therefore a value range of N is {T, T/2, T/4, T/8, T/16, T/32}. N practically represents the number of PFs in each cycle.

The location of the PO subframe is determined based on a type of LTE standard (Frequency Division Duplex (FDD) or Time Division Duplex (TDD)) and the parameters Ns and i_s. Herein, Ns represents the number of PO subframes in each PF, i_s represents an index of the PO subframe, Ns=max(1, nB/T) and i_s=floor(UE_ID/N) mod Ns. As shown in Table 1 and Table 2, only three values 1, 2 and 4 are adopted for Ns. For example, in a case that an LTE-FDD system is adopted at present and Ns=4, if i_s=0, then P0=0 and the paging message may be sent in the 0# subframe; if i_s=2, then P0=5 and the paging message may be sent in the 5# subframe. Finally, the UE determines the location of the PO for it in a cycle according to POs in the cell and its own UE_ID. By this way, UEs are averagely divided to different POs.

TABLE 1

| | (FDD) | | | |
|---|---|---|---|---|
| Ns | PO (i_s = 0) | PO (i_s = 1) | PO (i_s = 2) | PO (i_s = 3) |
| 1 | 9 | N/A | N/A | N/A |
| 2 | 4 | 9 | N/A | N/A |
| 4 | 0 | 4 | 5 | 9 |

TABLE 2

| | (TDD) | | | |
|---|---|---|---|---|
| Ns | PO (i_s = 0) | PO (i_s = 1) | PO (i_s = 2) | PO (i_s = 3) |
| 1 | 0 | N/A | N/A | N/A |
| 2 | 0 | 5 | N/A | N/A |
| 4 | 0 | 1 | 5 | 6 |

4) Paging in 5G

For definitions about time-frequency resources of a PO in 5G, one definition is to define a nominal resource corresponding to an SS block as a time-frequency resource for bearing a paging message in the PO. As illustrated in FIG. 7, on symbols where a nominal resource on which an SS block is actually transmitted is located, frequency division is implemented for a time-frequency resource corresponding to a PO and a time-frequency resource corresponding to the nominal resource, and such a time-frequency resource type corresponding to the PO is called a first time-frequency resource type; and on symbols where a nominal resource on which no SS block is transmitted is located, a time-frequency resource corresponding to the PO may include a time-frequency resource corresponding to the nominal resource, and such a time-frequency resource type corresponding to the PO is called a second time-frequency resource type.

For the two time-frequency resource types of the PO in FIG. 7, due to different time-frequency resource sizes, paging message bearing capabilities are also different. Particularly, for the first time-frequency resource type, since frequency division is implemented for the time-frequency resource corresponding to the PO and the time-frequency resource corresponding to the nominal resource, and in addition, a total bandwidth is required to meet a lowest bandwidth capability of UE, a bandwidth for bearing a paging message is quite limited. Meanwhile, because the paging message is sent in a beam scanning manner, the overhead is very large. One way to save overhead is to increase the number of UEs that may be paged in each PO, thereby reducing the total number of times for which the paging message is sent. For POs adopting the two time-frequency resource types, due to different resource sizes, different paging capabilities may be adopted, while in LTE, all UEs (corresponding to UE_IDs) are equally divided among POs.

For example, in LTE, UE_ID=(IMSI mod 1024), that is, all IMSIs are divided into 1,024 UE groups, where UEs in each UE group correspond to the same UE_ID. POs where different UE_IDs are located are calculated according to a formula i_s=floor(UE_ID/N) mod Ns, namely PO=f (UE_ID, N, Ns). In LTE, UE_IDs are unequally distributed in different POs. For example, if nB=32, namely there are 32 POs in a DRX cycle, there are 1,024/32=32 UE_IDs in each PO.

In the embodiments of the disclosure, UE_IDs are unequally distributed in POs. In some scenarios, for example, paging time units have different time-frequency resource types, it is impossible to implement differentiated allocation of paging resources. The technical solutions of the embodiments of the disclosure will be described below in combination with specific embodiments.

FIG. 8 is a first flowchart of a method for determining paging time according to an embodiment of the disclosure. As illustrated in FIG. 8, the method for determining paging time includes the following operation.

In S801, UE determines a paging time unit corresponding to the UE according to an ID of the UE, configuration parameters of paging time units, and preset rules. The paging time units at least include a paging time unit of a first type and a paging time unit of a second type, and paging time units of different types correspond to different preset rules.

In an implementation, the ID of the UE is an IMSI. Specifically, the UE determines UE_ID of the UE according to the following function: UE_ID=(IMSI mod S), where S represents a preset value and S is a positive integer.

For example, when S=1,024, UE_ID=(IMSI mod 1024).

Furthermore, the UE determines the paging time unit corresponding to the UE according to UE_ID of the UE, the configuration parameters of the paging time units, and the preset rules.

In the embodiment of the disclosure, different preset rules satisfy unequal distribution of UEs among paging time units of different types.

In an implementation, the paging time unit of the first type corresponds to a first time-frequency resource type, and the paging time unit of the second type corresponds to a second time-frequency resource type.

In the solution, the first time-frequency resource type is different from the second time-frequency resource type. Herein, that the first time-frequency resource type is different from the second time-frequency resource type refers to the following conditions.

1) A size of a time-frequency resource corresponding to the first time-frequency resource type is different from a size of a time-frequency resource corresponding to the second time-frequency resource type.

2) A scheme for multiplexing a time-frequency resource corresponding to the first time-frequency resource type and a time-frequency resource of an SS block is different from a scheme for multiplexing a time-frequency resource corresponding to the second time-frequency resource type and the time-frequency resource of the SS block.

3) The size of the time-frequency resource corresponding to the first time-frequency resource type is different from the size of the time-frequency resource corresponding to the second time-frequency resource type, and the scheme for multiplexing the time-frequency resource corresponding to the first time-frequency resource type and the time-frequency resource of the SS block is different from the scheme for multiplexing the time-frequency resource corresponding to the second time-frequency resource type and the time-frequency resource of the SS block.

In the solution, that paging time unit of the first type corresponds to the first time-frequency resource type in a case that:

On symbols where a nominal resource on which the SS block is transmitted is located, frequency division is implemented for a time-frequency resource corresponding to the paging time unit of the first type and the nominal resource.

In the solution, the paging time unit of the second type corresponds to the second time-frequency resource type in a case that:

On symbols where a nominal resource on which no SS block is transmitted is located, a time-frequency resource corresponding to the paging time unit of the second type includes a time-frequency resource where the nominal resource is located.

In the embodiment of the disclosure, the paging time unit includes a PO or part of time units in the PO.

In the embodiment of the disclosure, the configuration parameters of the paging time units include at least one of: distribution parameters of the UEs among the paging time units of the different types; or, numbers of paging time units corresponding to different time-frequency resource types in a transmission cycle. Furthermore, the UE acquires the configuration parameters of the paging time units from a network.

In an example, nB=nB1+nB2, and the UE determines the paging time unit corresponding to the UE according to the following function: f(UE_ID, nB1, nB2).

The function f represents the preset rule. UE_ID, nB1 and nB2, as input parameters of the function f (i.e., configuration parameters of the paging time unit), are respectively represented as follows.

$UE\_ID$=(IMSI mod 1024).

nB1 represents a number of paging time units corresponding to the first time-frequency resource type in a transmission cycle.

nB2 represents a number of paging time units corresponding to the second time-frequency resource type in a transmission cycle.

In the embodiment of the disclosure, different preset rules satisfy the unequal distribution of the UEs among paging time units of different types. That is, the number of UE_IDs distributed in each of paging time units corresponding to the first time-frequency resource type is different from the number of UE_IDs distributed in each of paging time units corresponding to the second time-frequency resource type.

In addition, the input parameters of the function f (i.e., the configuration parameters of the paging time units) may further include distribution parameters of the UEs the paging time units of the different types. For example, the total number of UE_IDs distributed in the paging time units corresponding to the first time-frequency resource type and the total number of UE_IDs distributed in the paging time units corresponding to the second time-frequency resource type are Nx1 and Nx2 respectively, and Nx2/Nx1=x. Based on this, $1,024/((i+x)nB1)$ UE_IDs are distributed in each PO of the first time-frequency resource type, and $1,024x/((1+x)nB1)$ UE_IDs are distributed in each PO of the second time-frequency resource type.

The technical solution of the embodiment of the disclosure is not limited to the above examples, and other manners through which unequal distribution of the UEs among the paging time units may be implemented shall also fall within the scope of protection of the embodiment of the disclosure.

For example, there are nB=16 paging time units in a DRX cycle, UE_ID=(IMSI mod 1024), namely there are totally 1,024 UE_IDs of UEs, and the 1,024 UE_IDs are equally distributed in the 16 paging time units. During a practical application, different numbers of UE_IDs may flexibly be configured for different paging time units according to different application scenarios, so as to implement balanced allocation of paging resources.

Figure 9:
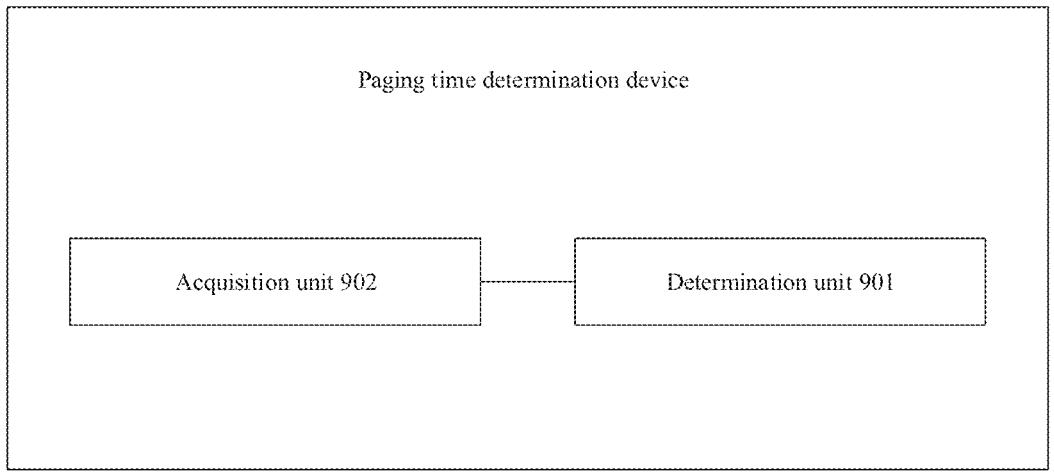
FIG. 9 is a first structure composition diagram of a device for determining paging time according to an embodiment of the disclosure.

FIG. 9 is a first structure composition diagram of a device for determining paging time according to an embodiment of the disclosure. As illustrated in FIG. 9, the device for determining paging time includes a determination unit 901.

The determination unit 901 is configured to determine a paging time unit corresponding to UE according to an ID of the UE, configuration parameters of the paging time units, and preset rules.

The paging time units at least include a paging time unit of a first type and a paging time unit of a second type, and paging time units of different types correspond to different preset rules.

In an implementation, different preset rules satisfy unequal distribution of UEs among paging time units of different types.

In an implementation, the paging time unit of the first type corresponds to a first time-frequency resource type, and the paging time unit of the second type corresponds to a second time-frequency resource type.

In an implementation, at least one of the following may apply:

a size of a time-frequency resource corresponding to the first time-frequency resource type is different from a size of a time-frequency resource corresponding to the second time-frequency resource type; or, a scheme for multiplexing a time-frequency resource corresponding to the first time-frequency resource type and a time-frequency resource of an SS block is different a scheme for multiplexing a time-frequency resource corresponding to the second time-frequency resource type and the time-frequency resource of the SS block.

In an implementation, the paging time unit of the first type corresponds to the first time-frequency resource type in a case that:

On symbols where a nominal resource on which the SS block is transmitted is located, frequency division is implemented for a time-frequency resource corresponding to the paging time unit of the first type and the nominal resource.

In an implementation, the paging time unit of the second type corresponds to the second time-frequency resource type in a case that:

On symbols where a nominal resource on which no SS block is transmitted is located, a time-frequency resource corresponding to the paging time unit of the second type includes a time-frequency resource where the nominal resource is located.

In an implementation, the paging time unit includes a PO or part of time units in the PO.

In an implementation, the configuration parameters of the paging time units include at least one of: distribution parameters of the UEs in different types of paging time units; or, the numbers of paging time units corresponding to different time-frequency resource types in a transmission cycle.

In an implementation, the device further includes an acquisition unit 902.

The acquisition unit 902 is configured to acquire the configuration parameters of the paging time units from a network.

Those skilled in the art should know that functions realized by each unit in the device for determining paging time illustrated in FIG. 9 may be understood with reference to related descriptions about the method for determining paging time. The functions of each unit in the device for determining paging time illustrated in FIG. 9 may be realized through a program running in a processor, and may also be realized through a specific logical circuit.

Figure 10:
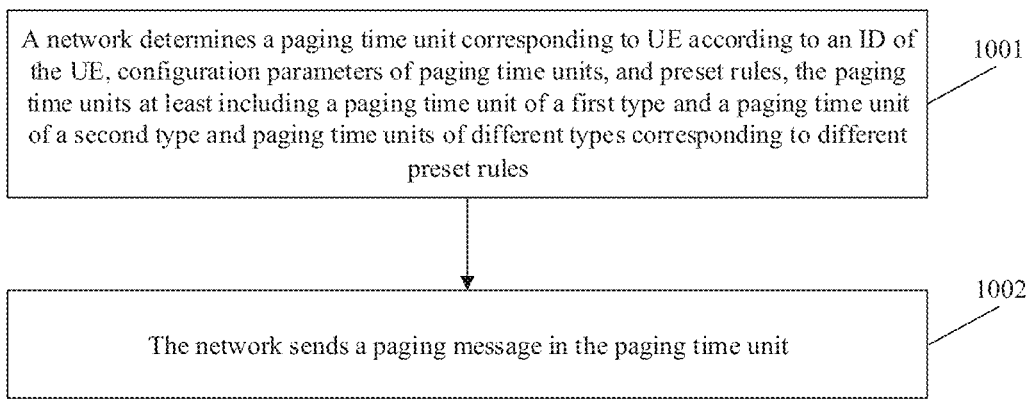
FIG. 10 is a second flowchart of a method for determining paging time according to an embodiment of the disclosure.

FIG. 10 is a second flowchart of a method for determining paging time according to an embodiment of the disclosure. As illustrated in FIG. 10, the method for determining paging time includes the following operations.

In 1001, a network determines a paging time unit corresponding to UE according to an ID of the UE, configuration parameters of paging time units, and preset rules. The paging time units at least include a paging time unit of a first unit and a paging time unit of a second type, and paging time units of different types correspond to different preset rules.

In the embodiment of the disclosure, different preset rules satisfy unequal distribution of UEs among paging time units of different types.

In the embodiment of the disclosure, the paging time unit of the first type corresponds to a first time-frequency resource type, and the paging time unit of the second type corresponds to a second time-frequency resource type.

In the embodiment of the disclosure, a size of a time-frequency resource corresponding to the first time-frequency resource type is different from a size of a time-frequency resource corresponding to the second time-frequency resource type;

and/or, a scheme for multiplexing the time-frequency resource corresponding to the first time-frequency resource type and a time-frequency resource of an SS block is different from a scheme for multiplexing the time-frequency resource corresponding to the second time-frequency resource type and the time-frequency resource of the SS block.

In the embodiment of the disclosure, the paging time unit of the first type corresponds to the first time-frequency resource type in a case that:

On symbols where a nominal resource on which the SS block is transmitted is located, frequency division may be implemented for a time-frequency resource corresponding to the paging time unit of the first type and the nominal resource.

In the embodiment of the disclosure, the paging time unit of the second type corresponds to the second time-frequency resource type in a case that:

On symbols where a nominal resource on which no SS block is transmitted is located, a time-frequency resource corresponding to the paging time unit of the second type includes a time-frequency resource where the nominal resource is located.

In the embodiment of the disclosure, the paging time unit includes a PO or part of time units in the PO.

In the embodiment of the disclosure, the configuration parameters of the paging time units include at least one of: distribution parameters of the UEs in paging time units of different types; or, numbers of paging time units corresponding to different time-frequency resource types in a transmission cycle.

In 1002, the network sends a paging message in the paging time unit.

In the embodiment of the disclosure, the method further includes that: the network notifies the configuration parameters of the paging time units to the UE.

Those skilled in the art should know that a paging time determination manner for a network side corresponds to a paging time determination manner for a UE side.

Figure 11:
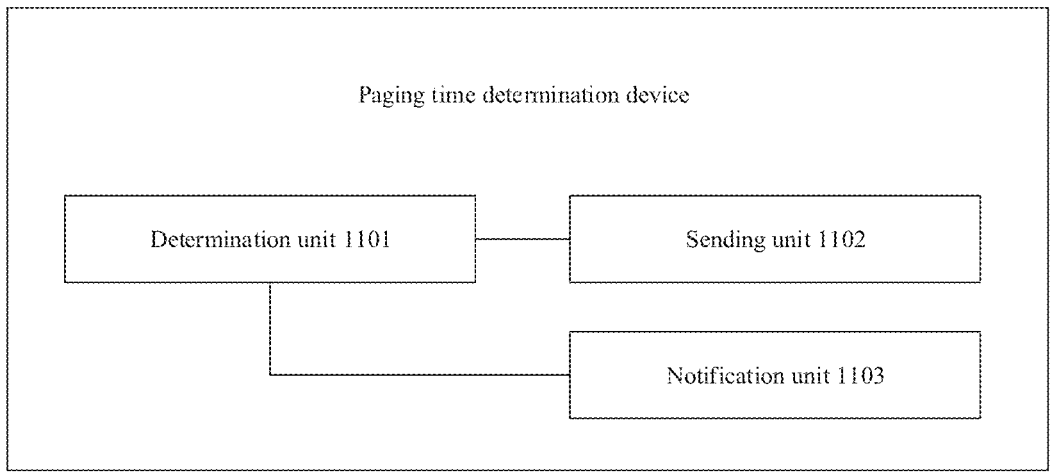
FIG. 11 is a second structure composition diagram of a device for determining paging time according to an embodiment of the disclosure.

FIG. 11 is a second structure composition diagram of a device for determining paging time according to an embodiment of the disclosure. As illustrated in FIG. 11, the device includes a determination unit 1101 and a sending unit 1102.

The determination unit 1101 is configured to determine a paging time unit corresponding to UE according to an ID of the UE, configuration parameters of paging time units, and preset rules. The paging time units at least include a paging time unit of a first type and a paging time unit of a second type, and paging time units of different types correspond to different preset rules.

The sending unit 1102 is configured to send a paging message in the paging time unit.

In the embodiment of the disclosure, different preset rules satisfy unequal distribution of UEs among paging time units of different types.

In the embodiment of the disclosure, the paging time unit of the first type corresponds to a first time-frequency resource type, and the paging time unit of the second type corresponds to a second time-frequency resource type.

In the embodiment of the disclosure, a size of a time-frequency resource corresponding to the first time-frequency resource type is different from a size of a time-frequency resource corresponding to the second time-frequency resource type;

and/or, a scheme for multiplexing the time-frequency resource corresponding to the first time-frequency resource type and a time-frequency resource of an SS block is a scheme for multiplexing the time-frequency resource corresponding to the second time-frequency resource type and the time-frequency resource of SS block.

In the embodiment of the disclosure, the paging time unit of the first type corresponds to the first time-frequency resource type in a case that:

On symbols where a nominal resource on which the SS block is transmitted is located, frequency division may be implemented for a time-frequency resource corresponding to the paging time unit of the first type and the nominal resource.

In the embodiment of the disclosure, the paging time unit of the second type corresponds to the second time-frequency resource type in a case that:

On symbols where a nominal resource on which no SS block is transmitted is located, a time-frequency resource corresponding to the paging time unit of the second type includes a time-frequency resource where the nominal resource is located.

In the embodiment of the disclosure, the paging time unit includes a PO or part of time units in the PO.

In the embodiment of the disclosure, the configuration parameters of the paging time units include at least one of: distribution parameters of the UEs among different types of paging time units; or, numbers of paging time units corresponding to different time-frequency resource types in a transmission cycle.

In the embodiments of the disclosure, the device further includes a notification unit 1103.

The notification unit 1103 is configured to notify the configuration parameters of the paging time units to the UE.

When being implemented in form of software functional module and sold or used as an independent product, the paging time determination device of the embodiment of the disclosure may be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer-executable instruction is stored, the computer-executable instruction being executed by a processor to implement the paging time determination method of the embodiments of the disclosure.

Figure 12:
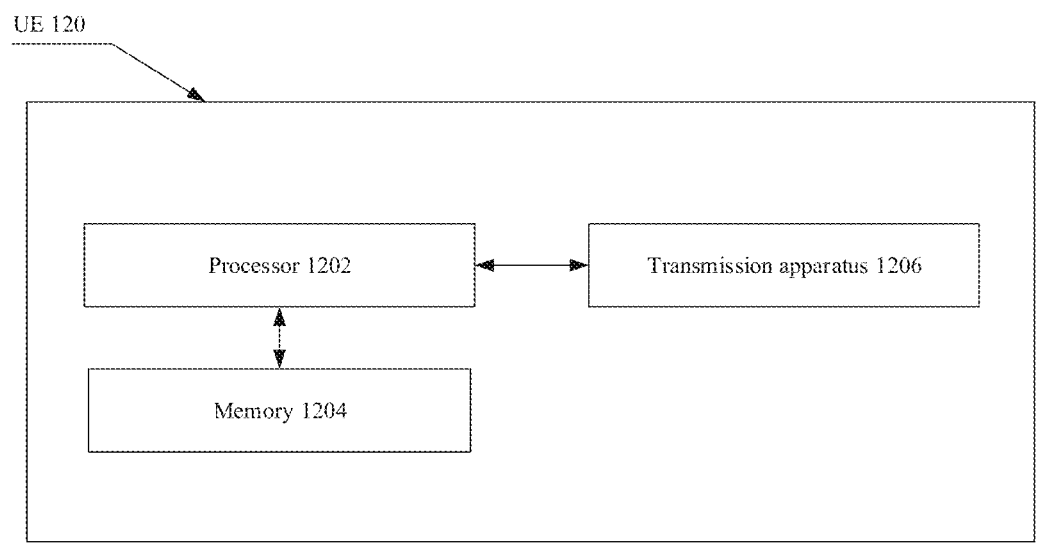
FIG. 12 is a structure composition diagram of UE according to an embodiment of the disclosure.

FIG. 12 is a structure composition diagram of UE according to an embodiment of the disclosure. As illustrated in FIG. 12, the UE 120 may include one or more (only one is illustrated in the figure) processors 1202 (the processor 1202 may include, but not limited to, a processing device such as a Micro Controller Unit (MCU) or a Field Programmable Gate Array (FPGA)), a memory 1204 configured to store data, and a transmission apparatus 1206 configured for communication. Those of ordinary skill in the art should know that the structure illustrated in FIG. 12 is only schematic and not intended to limit the structure of the electronic device. For example, the UE 120 may further include components more or fewer than the components illustrated in FIG. 12 or has a configuration different from that illustrated in FIG. 12.

The memory 1204 may be configured to store a software program of application software and a module, for example, program instructions/modules corresponding to a paging time determination method in the embodiments of the disclosure. The processor 1202 runs the software program and modules stored in the memory 1204, thereby executing various functional applications and data processing, namely implementing the abovementioned method. The memory 1204 may include a high-speed random access memory and may also include a nonvolatile memory, for example, one or more magnetic storage devices, flash memories or other nonvolatile solid-state memories. In some examples, the memory 1204 may further include a memory arranged remotely relative to the processor 1202 and the remote memory may be connected to the UE 120 through a network. An example of the network includes, but not limited to, the Internet, an intranet, a local area network, a mobile communication network and a combination thereof.

The transmission apparatus 1206 is configured to receive or send data through a network. A specific example of the network may include a wireless network provided by a communication provider of the UE 120. In an example, the transmission apparatus 1206 includes a Network Interface Controller (NIC), which may be connected with another network device through a base station, thereby communicating with the Internet. In an example, the transmission apparatus 1206 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit, and two or more than two units may also be integrated into a unit. The integrated unit may be implemented in a hardware form and may also be implemented in form of hardware and software functional unit.

The above are only the specific implementations of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for determining paging time, comprising:
   determining (801), by a User Equipment (UE), a paging time unit corresponding to the UE, the determination being made according to an Identifier (ID) of the UE, configuration parameters of paging time units, and preset rules,
   wherein the paging time units at least comprise a paging time unit of a first type and a paging time unit of a second type, and paging time units of different types correspond to different preset rules;
   the paging time unit of the first type corresponds to a first time-frequency resource type, and the paging time unit of the second type corresponds to a second time-frequency resource type; and
   a size of a time-frequency resource corresponding to the first time-frequency resource type is different from a size of time-frequency resource corresponding to the second time-frequency resource type.

2. The method of claim 1, wherein the different preset rules satisfy unequal distribution of UEs among the paging time units of the different types.

3. The method of claim 1, wherein
a scheme for multiplexing the time-frequency resource corresponding to the first time-frequency resource type and a time-frequency resource of a Synchronization Signal (SS) block is different from a scheme for multiplexing the time-frequency resource corresponding to the second time-frequency resource type and the time-frequency resource of the SS block.

4. The method of claim 1, wherein the paging time unit comprises a Paging Occasion (PO) or part of time units in the PO.

5. A User Equipment (UE), comprising:
a processor (1202); and
a memory (1204) storing computer readable instructions executable by the processor (1202),
wherein the processor (1202) is configured to:
determine a paging time unit corresponding to a User Equipment (UE), the determination being made according to an Identifier (ID) of the UE, configuration parameters of paging time units, and preset rules,
wherein the paging time units comprise a paging time unit of a first type and a paging time unit of a second type, and paging time units of different types correspond to different preset rules;
the paging time unit of the first type corresponds to a first time-frequency resource type, and the paging time unit of the second type corresponds to a second time-frequency resource type; and
a size of a time-frequency resource corresponding to the first time-frequency resource type is different from a size of time-frequency resource corresponding to the second time-frequency resource type.

6. The UE of claim 5, wherein the different preset rules satisfy unequal distribution of UEs among the paging time units of the different types.

7. The UE of claim 5, wherein
a scheme for multiplexing the time-frequency resource corresponding to the first time-frequency resource type and a time-frequency resource of a Synchronization Signal (SS) block is different from a scheme for multiplexing the time-frequency resource corresponding to the second time-frequency resource type and the time-frequency resource of the SS block.

8. The UE of claim 5, wherein the paging time unit of the first type corresponds to the first time-frequency resource type in a case that:
on symbols where a nominal resource on which a Synchronization Signal (SS) block is transmitted is located, frequency division is implemented for a time-frequency resource corresponding to the paging time unit of the first type and the nominal resource.

9. The UE of claim 5, wherein the paging time unit of the second type corresponds to the second time-frequency resource type in a case that:
on symbols where a nominal resource on which no Synchronization Signal (SS) block is transmitted is located, a time-frequency resource corresponding to the paging time unit of the second type comprises a time-frequency resource where the nominal resource is located.

10. The UE of claim 5, wherein the paging time unit comprises a Paging Occasion (PO) or part of time units in the PO.

* * * * *